(12) United States Patent
Kupratis et al.

(10) Patent No.: US 10,100,739 B2
(45) Date of Patent: Oct. 16, 2018

(54) COOLED COOLING AIR SYSTEM FOR A GAS TURBINE ENGINE

(71) Applicant: United Technologies Corporation, Hartford, CT (US)

(72) Inventors: Daniel Bernard Kupratis, Wallingford, CT (US); Paul R. Hanrahan, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 687 days.

(21) Appl. No.: 14/714,554

(22) Filed: May 18, 2015

(65) Prior Publication Data

US 2016/0341126 A1 Nov. 24, 2016

(51) Int. Cl.
*F02C 6/08* (2006.01)
*F02C 7/18* (2006.01)
*F02C 7/143* (2006.01)
*F02C 9/18* (2006.01)

(52) U.S. Cl.
CPC .............. *F02C 7/185* (2013.01); *F02C 6/08* (2013.01); *F02C 7/143* (2013.01); *F02C 9/18* (2013.01); *F05D 2240/40* (2013.01); *F05D 2260/20* (2013.01); *F05D 2260/211* (2013.01); *Y02T 50/675* (2013.01)

(58) Field of Classification Search
CPC .. F02C 6/08; F02C 7/143; F02C 7/185; F02C 9/18; F05D 2240/40; F05D 2260/20; F05D 2260/211; Y02T 50/675
See application file for complete search history.

(56) References Cited

U.S. PATENT DOCUMENTS

| 2,692,476 | A | 10/1954 | Schaal et al. |
| 3,878,677 | A | 4/1975 | Colvin |
| 4,254,618 | A | 3/1981 | Elovic |

(Continued)

FOREIGN PATENT DOCUMENTS

| DE | 2852057 | 6/1979 |
| EP | 0447886 | 9/1991 |

(Continued)

OTHER PUBLICATIONS

European Search Report for Application No. 16170021.6 dated Oct. 11, 2016.

(Continued)

*Primary Examiner* — Jesse Bogue
(74) *Attorney, Agent, or Firm* — Carlson, Gaskey & Olds, P.C.

(57) ABSTRACT

A gas turbine engine includes a compressor section, a combustor fluidly connected to the compressor section via a primary flowpath and a turbine section fluidly connected to the combustor via the primary flowpath. Also included is a cascading cooling system having a first inlet connected to a first compressor bleed, a second inlet connected to a second compressor bleed downstream of the first compressor bleed, and a third inlet connected to a third compressor bleed downstream of the second compressor bleed. The cascading cooling system includes at least one heat exchanger configured to incrementally generate cooling air for at least one of an aft compressor stage and a foremost turbine stage relative to fluid flow through the turbine section.

8 Claims, 7 Drawing Sheets

(56) References Cited

U.S. PATENT DOCUMENTS

| | | |
|---|---|---|
| 4,539,945 A | 9/1985 | Bosisio |
| 4,882,902 A | 11/1989 | Reigel et al. |
| 5,056,335 A | 10/1991 | Renninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A * | 5/1995 | Glickstein ............ B64D 13/006 60/39.83 |
| 5,452,573 A | 9/1995 | Glickstein et al. |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A | 4/2000 | Durgin et al. |
| 6,065,282 A | 5/2000 | Fukue et al. |
| 6,134,880 A | 10/2000 | Yoshinaka |
| 6,430,931 B1 | 8/2002 | Horner |
| 6,487,863 B1 | 12/2002 | Chen et al. |
| 6,612,114 B1 | 9/2003 | Klingels |
| 6,892,523 B2 | 5/2005 | Fetescu et al. |
| 7,237,386 B2 | 7/2007 | Hoffman et al. |
| 7,246,484 B2 * | 7/2007 | Giffin, III ................ F02K 3/072 60/226.3 |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seitzer et al. |
| 7,882,691 B2 | 2/2011 | Lemmers, Jr. et al. |
| 7,886,520 B2 | 2/2011 | Stretton et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 * | 3/2013 | Roberge ................ F02K 3/072 60/226.1 |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0090096 A1 * | 4/2009 | Sheridan ................ F02C 7/36 60/226.3 |
| 2009/0145102 A1 * | 6/2009 | Roberge ................ F01D 1/023 60/39.162 |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2010/0043396 A1 | 2/2010 | Coffinberry |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | Defrancesco |
| 2013/0036747 A1 | 2/2013 | Fuchs et al. |
| 2013/0067928 A1 * | 3/2013 | Arias Chao ............ F02C 7/185 60/782 |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0186102 A1 | 7/2013 | Lo |
| 2013/0199156 A1 | 8/2013 | Ress, Jr. et al. |
| 2013/0239583 A1 | 9/2013 | Suciu et al. |
| 2013/0319002 A1 | 12/2013 | Sidelkovskiy et al. |
| 2014/0020506 A1 | 1/2014 | Duong |
| 2014/0137417 A1 | 5/2014 | Silberberg et al. |
| 2014/0196469 A1 | 7/2014 | Finney et al. |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 * | 10/2014 | Laurello ................ F02C 7/18 60/782 |
| 2014/0341704 A1 | 11/2014 | Fletcher |
| 2014/0352315 A1 | 12/2014 | Diaz |
| 2015/0114611 A1 | 4/2015 | Morris et al. |
| 2015/0285147 A1 | 10/2015 | Phillips et al. |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0152765 A1 * | 6/2017 | Uechi ................ F01K 23/10 |
| 2017/0159568 A1 | 6/2017 | Sennoun et al. |
| 2017/0167388 A1 | 6/2017 | Merry et al. |
| 2017/0175632 A1 | 6/2017 | Hanrahan et al. |
| 2017/0184027 A1 | 6/2017 | Moniz et al. |
| 2017/0204787 A1 | 7/2017 | Duesler et al. |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |

(56) References Cited

FOREIGN PATENT DOCUMENTS

| | | |
|---|---|---|
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for EP Application No. 17160816.9 dated Jul. 21, 2017.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.

* cited by examiner

COOLED COOLING AIR SYSTEM FOR A GAS TURBINE ENGINE

TECHNICAL FIELD

The present disclosure relates generally to gas turbine engines, and more specifically to a cooled cooling air system for a gas turbine engine.

BACKGROUND

Gas turbine engines, such as those utilized on commercial and military aircraft, include a compressor section that draws in air, a combustor section that mixes the compressed air with a fuel, and ignites the mixture, and a turbine section across which the results of the combustion are expanded. The expansion across the turbine section drives the turbine section to rotate, which in turn drives rotation of the compressor.

In some example engines, this configuration results in excess heat at the aft stages of the compressor section and in the turbine section. In order to prevent the excess heat from damaging engine components, or reducing the lifecycle of engine components, portions of the compressor section and the turbine section are actively cooled using cooled cooling air.

SUMMARY OF THE INVENTION

In one exemplary embodiment a gas turbine engine includes a compressor section, a combustor fluidly connected to the compressor section via a primary flowpath, a turbine section fluidly connected to the combustor via the primary flowpath, and a cascading cooling system having a first inlet connected to a first compressor bleed, a second inlet connected to a second compressor bleed downstream of the first compressor bleed, and a third inlet connected to a third compressor bleed downstream of the second compressor bleed. The cascading cooling system includes at least one heat exchanger configured to incrementally generate cooling air for at least one of an aft compressor stage and a foremost turbine stage relative to fluid flow through the turbine section.

In another exemplary embodiment of the above described gas turbine engine, the third compressor bleed is at an outlet of the compressor section.

In another exemplary embodiment of any of the above described gas turbine engines, the at least one heat exchanger includes a first heat exchanger, a second heat exchanger in series with the first heat exchanger, and a third heat exchanger in series with the second heat exchanger.

In another exemplary embodiment of any of the above described gas turbine engines, a heat sink input of the second heat exchanger is a cooled flow output of the first heat exchanger and originates at the first inlet, and wherein a heat sink input of the third heat exchanger is a cooled flow output of the second heat exchanger and originates at the second inlet.

In another exemplary embodiment of any of the above described gas turbine engines, a cooled flow output of the third heat exchanger is provided to an aft most compressor stage as a cooled cooling flow and originates at the third inlet.

In another exemplary embodiment of any of the above described gas turbine engines, the at least one heat exchanger includes a parallel heat exchanger having at least a first heat sink input, a first cooled flow input and a second cooled flow input, and wherein fluid passing through the first cooled flow input is simultaneously cooled by the first heat sink input and cools the second cooled flow input.

In another exemplary embodiment of any of the above described gas turbine engines, the at least one heat exchanger further includes a third cooled flow input, and fluid passing through the second cooled flow input is simultaneously cooled by the first cooled flow input and cools the third cooled flow input.

In another exemplary embodiment of any of the above described gas turbine engines, the third cooled flow input is returned to an aft most compressor stage as a cooled cooling flow.

In another exemplary embodiment of any of the above described gas turbine engines, further includes an auxiliary compressor system having an auxiliary turbine connected to an auxiliary compressor such that rotation of the auxiliary turbine drives rotation of the auxiliary compressor, and wherein an input of the auxiliary turbine is connected to a heat sink outlet of a third heat exchanger such that cooling air originating at the second compressor bleed is compressed in the auxiliary compressor.

In another exemplary embodiment of any of the above described gas turbine engines, an output of the auxiliary compressor system is provided to a foremost stage of the turbine section as cooled cooling air.

In another exemplary embodiment of any of the above described gas turbine engines, an input of the auxiliary turbine is at least one of an output heat sink air of a second heat exchanger, and an output heat sink air of a fourth heat exchanger, and wherein an output of the auxiliary turbine is returned to a compressor section inlet.

In another exemplary embodiment of any of the above described gas turbine engines, the input of the auxiliary turbine is a combination of a heat sink output of the second heat exchanger, and a heat sink output of the fourth heat exchanger, and wherein the combination is controlled by a modulation valve.

In another exemplary embodiment of any of the above described gas turbine engines, fluid flow through the auxiliary turbine is at least partially controlled by a modulation valve downstream of an auxiliary turbine outlet, and wherein fluid flow to the inlet of the auxiliary compressor is at least partially controlled by a modulation valve connecting the heat sink outlet of the third heat exchanger to a second or later stage of the turbine section.

In another exemplary embodiment of any of the above described gas turbine engines, each of the modulation valves is controlled by at least one controller.

In another exemplary embodiment of any of the above described gas turbine engines, the gas turbine engine is a geared turbofan engine.

In another exemplary embodiment of any of the above described gas turbine engines, the gas turbine engine is a multiple bypass flow engine.

An exemplary method for generating cooled cooling air in a gas turbine engine includes providing air from a plurality of compressor bleeds as inputs to a cascading heat exchanger, incrementally cooling air received via the inputs such that a first of the inputs is a heat sink for a second of the inputs, and the second of the inputs is a heat sink for a third of the inputs, and actively cooling at least one of an aft most compressor stage and a fore most turbine stage using cooled cooling air output from the cascading heat exchanger.

In a further example of the above described exemplary method for generating cooled cooling air in a gas turbine engine, incrementally cooling air received via the inputs includes cooling the air using a plurality of serially arranged heat exchangers, each of the serially arranged heat exchangers increasing a pressure of cooled output air relative to a serially previous heat exchanger.

In a further example of any of the above described exemplary methods for generating cooled cooling air in a gas turbine engine, incrementally cooling air received via the inputs includes cooling the air using at least one parallel heat exchanger configured such that air from at least one of the inputs simultaneously cools an adjacent air flow and is cooled by another adjacent airflow.

In one exemplary embodiment a gas turbine engine includes a compressor section, a combustor fluidly connected to the compressor section via a primary flowpath, a turbine section fluidly connected to the combustor via the primary flowpath, and a cascading cooling system having a plurality of inlets, each of the inlets connected to one of a plurality of compressor bleeds. The cascading cooling system includes at least one heat exchanger configured to incrementally generate a cooled cooling air across a plurality of stages, each of the stages having approximately the same pressure differential as each other of the stages.

These and other features of the present invention can be best understood from the following specification and drawings, the following of which is a brief description.

DETAILED DESCRIPTION OF AN EMBODIMENT

Figure 1:
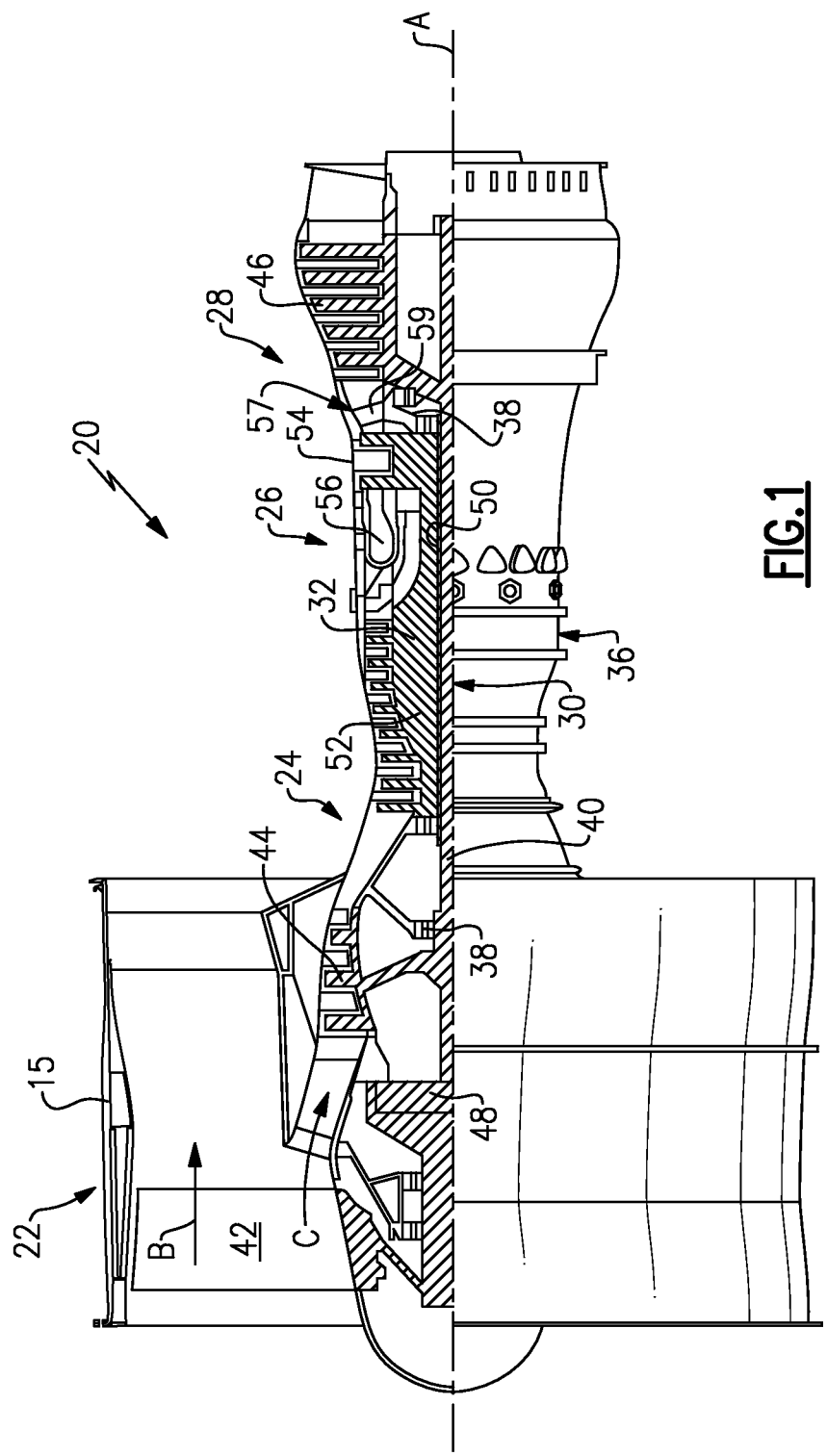
FIG. 1 schematically illustrates a first exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

With regards to engines for military applications, there has recently been provision of multiple bypass flow engines. An example multiple bypass flow engine is shown schematically in FIG. 2. A first stage fan 180 delivers air into an outer housing 181. The outer housing 181 defines an outer bypass duct 182 outwardly of an inner housing 183. The outer bypass duct 182 is alternatively referred to as a "third stream", and air from the outer bypass duct 182 is referred to as third stream air. A second stage fan 184 delivers air downstream of the first stage fan 180 into an inner bypass duct 186. The inner bypass duct 186 is defined between an inner periphery of the inner housing 183 and an outer periphery of a core housing 187. Core housing 187 defines a radially inner extent of inner bypass duct 186. Controls 196 and 198 are shown schematically. In one example, the controls are nozzles which control the flow of air through the bypass flow ducts 182 and 186.

The first stage fan 180 delivers air inwardly of outer housing 181 and inwardly of inner housing 183. A second stage fan 184 delivers air inwardly of inner housing 183, but does not deliver air inwardly of the outer housing 181.

A core engine inlet 188 receives air downstream of the second stage fan 184. That air passes into a compressor 190, a combustor 192 and a turbine 194. It should be understood that the compressor 190 may include multiple rotors and the turbine 194 may also comprise multiple rotors. The turbine rotors drive the compressor 190 and the fan stages 180 and 184.

In some examples, the aft stages of the compressor section 24, 190 and the turbine section 28, 194 of a given engine 20 are actively cooled using cooled cooling air sourced at one or more compressor bleeds. The cooling air bleed from the compressor section 24, 190 is cooled in a heat exchanger using air from the bypass flowpath B as a heat sink, in the example of FIG. 1, or using air from the third stream 182, in the example of FIG. 2. A fraction of air is bled from the compressor section 24, 190 diffuser and cooled in a heat exchanger and is returned to the compressor section 24, 190 and/or the turbine section 28, 194.

When the air is fully cooled in a single step, the pressure differential between the cold side of the heat exchanger (the bypass flow path B or the third stream 182) and the compressor bleed can be excessively high. Further, the magnitude of cooling required in a single cooling step incurs a large thermal gradient across the heat exchanger. The high pressure differential and large thermal gradients places high stresses on the heat exchanger in the cooling step. The high stresses in turn, reduce the life cycle of the heat exchanger, require the heat exchanger to be excessively large and heavy to accommodate the higher stresses, or both.

Figure 3:
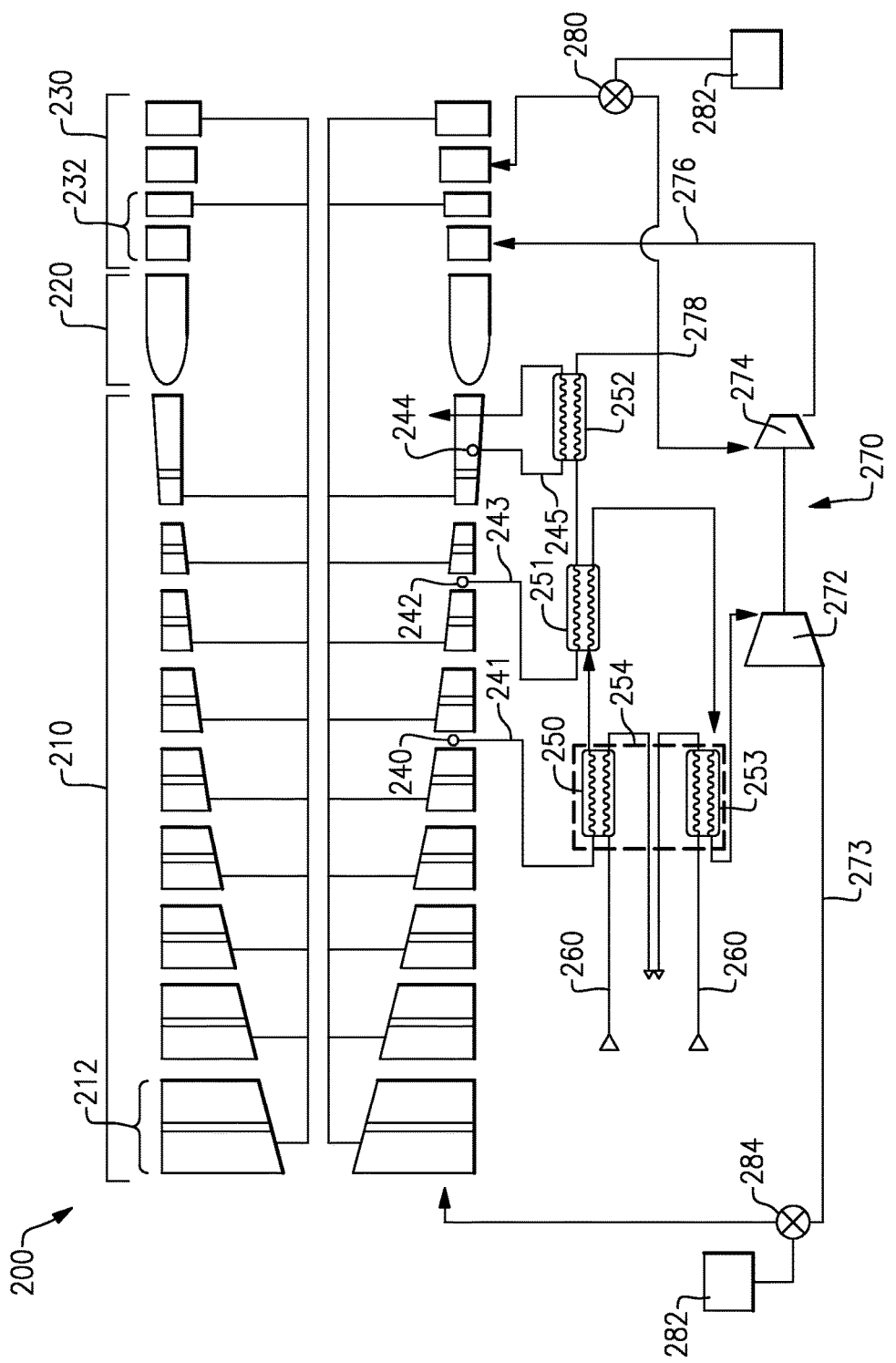
FIG. 3 schematically illustrates a first example cooled cooling air system for a gas turbine engine.

In order to minimize the weight requirements and the thermal stresses on the heat exchanger, an example gas turbine engine 200, schematically illustrated in FIG. 3, utilizes a cascaded heat exchanger configuration to provide cooled cooling air to the segments of the engine 200 being actively cooled. The example gas turbine engine 200 includes a compressor section 210 having multiple stages 212, a combustor section 220, and a turbine section 230 having multiple stages 232.

A mid compressor bleed 240 withdraws a first bleed air 241 from a compressor flowpath between compressor stages 212 at approximately midway through the compressor section 210. The first bleed air 241 is provided to a first heat exchanger 250. Also provided to the heat exchanger 250 is cold air 260 from the bypass flowpath (in the case of a geared turbofan engine) or the third stream (in the case of a multiple bypass flow engine). The cold air 260 is used as a heat sink in the first heat exchanger 250 to cool the first bleed air 241.

A second compressor bleed 242, aft of the mid compressor bleed 240, withdraws a second bleed air 243 from between compressor stages 212. The second bleed air 243 is provided to a second heat exchanger 251. Also provided to the second heat exchanger 251 is the cooled air output of the first heat exchanger 250. The cooled air output of the first heat exchanger 250 is the first bleed air 241. The first bleed air 241 acts as a heat sink for the second bleed air 243 in the second heat exchanger 251.

A third compressor bleed 244 is positioned at an aft end of the compressor section 210. The third compressor bleed 244 removes a third bleed air 245 from the compressor flowpath, and provides the third bleed air 245 to a third heat exchanger 252. Also provided to the third heat exchanger 252 is the cooled air output of the second heat exchanger 251. The cooled air output of the second heat exchanger 251 is the second bleed air 243. The second bleed air 243 acts as a heat sink for the third bleed air 245 in the third heat exchanger 252. Once cooled in the third heat exchanger, the third bleed air is returned to the aftmost stage 212 of the compressor section 210 and actively cools the aftmost stage 212. Because the third bleed air 245 is pulled from a third compressor bleed 244 at the aftmost stage, the pressure difference between the third bleed air 245 and the compressor flowpath at the point where the third bleed air 245 is returned to the compressor flowpath is minimal.

The heat sink air from the second heat exchanger 251 is provided to a fourth heat exchanger 253. As with the first heat exchanger 250, the fourth heat exchanger 253 is provided cold air 260 from the bypass flowpath (in the case of a geared turbofan engine) or the third stream (in the case of a multiple bypass flow engine). The cold air 260 cools the heat sink air from the second heat exchanger 251.

The heat sink air in the first heat exchanger 250 and the fourth heat exchanger 253 is drawn from the same source. As a result, in some configurations, the first heat exchanger 250 and the fourth heat exchanger 253 can be combined into a single heat exchanger 254. The output heat sink air from both the first heat exchanger 250 and the fourth heat exchanger 253, or the combined heat exchanger 254, is returned to the bypass flowpath or the third stream.

Also included within the gas turbine engine 200 is an auxiliary compressor system 270. The auxiliary compressor system 270 includes an auxiliary turbine 272 and an auxiliary compressor 274. The cooled air output of the fourth heat exchanger 253 (the first bleed air 241) is provided to the turbine 272, and expanded across the auxiliary turbine 272. The expansion across the turbine drives rotation of the auxiliary compressor 274. The auxiliary compressor 274, in turn, receives and compresses at least a portion of the second bleed air 243 after the second bleed air 243 has been utilized as a heat sink in the third heat exchanger 252.

An auxiliary compressor output 276 is provided as cooled cooling air to the first turbine stage 232. In some example cooling systems, a portion of the second bleed air 243 is provided to a second or later stage 232 of the turbine section 230 and provides active cooling. The portion is removed from the second bleed air 243 prior to the second bleed air 243 being provided to the auxiliary compressor 274 at a branch 278. A valve 280 controls the amount of air removed from the second bleed air 243 prior to being provided to the auxiliary compressor 274. The valve 280 is connected to and controlled by an engine controller 282, or any other similar control device.

In some examples, the flow of first bleed air 241 through the auxiliary turbine 272 is controlled via a second valve 284. The second valve 284 is also controlled via the engine controller 282. Expanded air 273 is output from the auxiliary turbine 272 and returned to an inlet of the compressor section 210, where it is ingested and recompressed through the compressor section 210.

Figure 4:
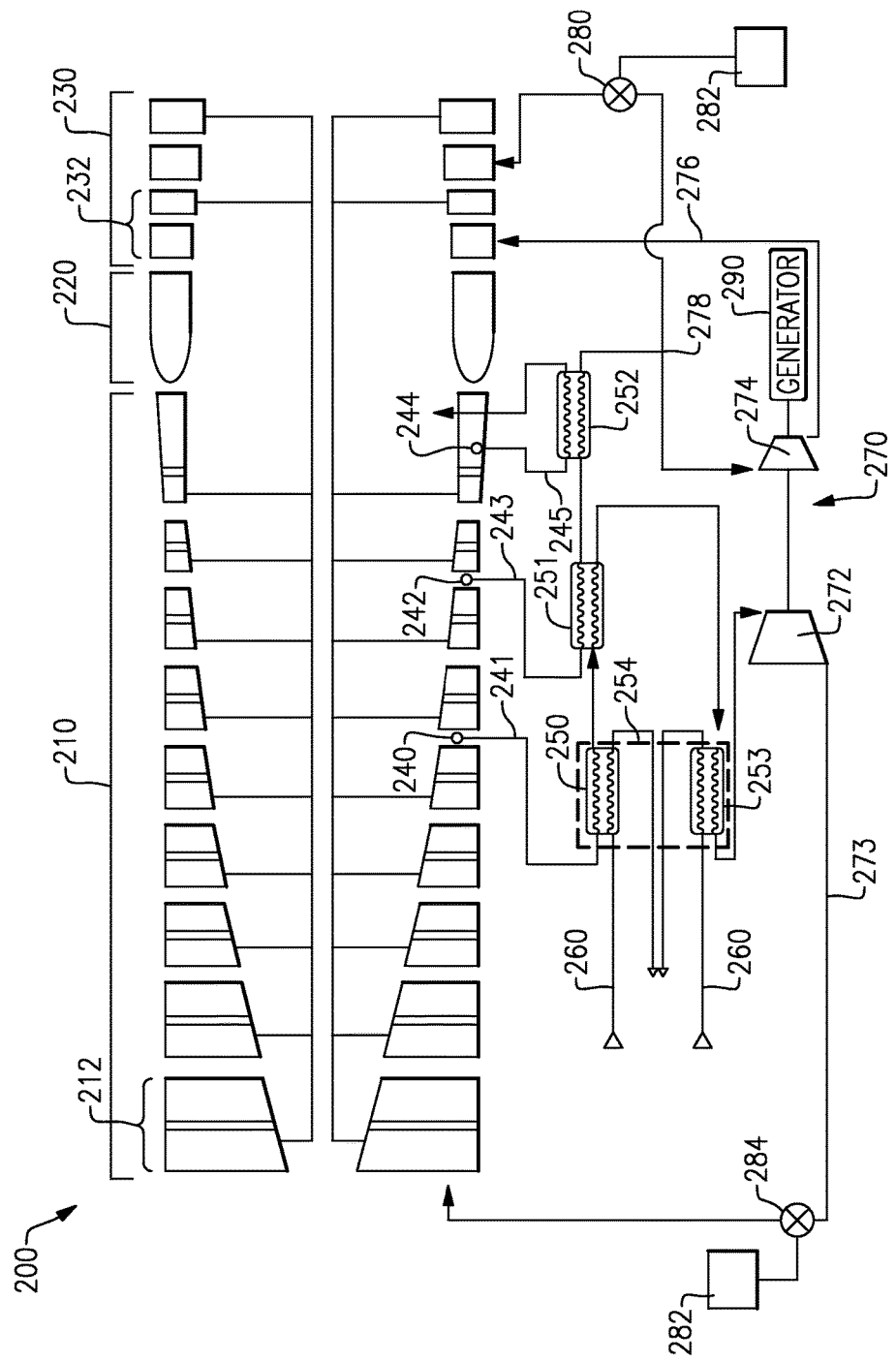
FIG. 4 schematically illustrates the first example cooled cooling air system for a gas turbine engine with the addition of an auxiliary generator.

In some examples, the gas turbine engine 200 can further include an auxiliary generator 290. An exemplary gas turbine engine 200 with the additional inclusion of an auxiliary generator 290 is illustrated in FIG. 4. The auxiliary generator 290 is connected to the auxiliary compressor 274, and is driven to rotate by the rotation of the auxiliary compressor 274. The rotation of the auxiliary generator 290 generates electrical power according to known electricity generation principles. The auxiliary generator 290 can be connected to aircraft electrical systems and provide electrical power to onboard electronic systems.

With continued reference to FIGS. 3 and 4, the pressure differential between the first bleed air 241 and the heat sink air of the first heat exchanger 250 is relatively small. The heat sink configuration is cascaded upward in pressure, while maintaining approximately the same relatively small pressure differential, such that the cooled air in each heat exchanger 250, 251, 252, 253 is cooled by a heat sink air with a relatively small pressure differential. In some examples, the pressure differential in each heat exchanger 250, 251, 252, 253 is approximately the same. This upward cascade in cooling and pressure is referred to as a cascaded cooled cooling air system.

Figure 5:
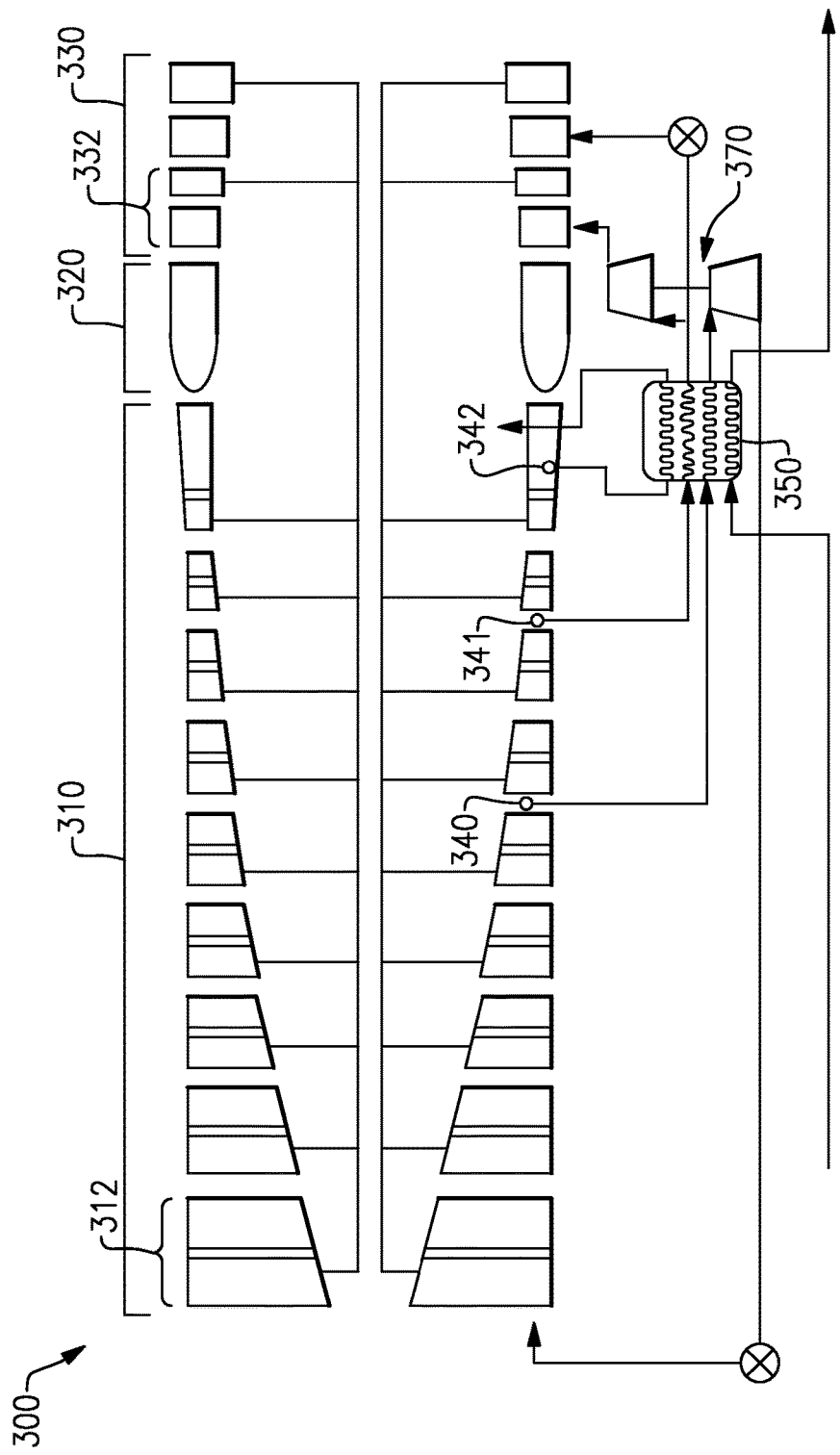
FIG. 5 schematically illustrates a second example cooled cooling air system for a gas turbine engine.

With continued reference to FIGS. 3 and 4, FIG. 5 illustrates an alternate heat exchanger 250 arrangement for providing cascaded cooled cooling air to cool an aft stage of a compressor 310 and at least a first stage of a turbine 330. As with the example of FIGS. 3 and 4, the example gas turbine engine 300 of FIG. 5 includes a compressor section 310 having multiple stages 312, a combustor section 320, and a turbine section 330 having multiple stages 332. In place of the first, second, third and fourth heat exchangers 250, 251, 252, 253 of FIGS. 3 and 4, the example gas turbine engine of FIG. 5 utilizes a single parallel heat exchanger 350. The parallel heat exchanger 350 utilizes parallel flows, where a single flow acts as a heat sink to one adjacent flow and is actively cooled by another adjacent flow.

As with the examples of FIGS. 3 and 4, the example of FIG. 5 utilizes a first compressor bleed 340 at an approximate mid-point in the compressor 310, a second compressor bleed 341 aft of the first compressor bleed 340, and a third compressor bleed aft of the second compressor bleed 341. The cooled cooling air for each area in the example of FIG. 5 is generated in the same manner as described above with regards to the examples of FIGS. 3 and 4. Similarly, an auxiliary compressor system 370 is connected to the outputs of the parallel heat exchanger 350 in the example of FIG. 5.

The heating and cooling flows through the parallel heat exchanger 350 are cooled via identical heat sinks as the sequential heat exchangers 250, 251, 252, 253 described above with regards to FIGS. 3 and 4, and provide for the same heating and cooling generation. One of skill in the art, having the benefit of this disclosure, will understand that any number of sequential heat exchangers can be combined into at least one parallel heat exchanger, provided the required heat duties sustain a positive temperature gradient between each adjacent pair of fluids. Further, the number of sequential heat exchangers and parallel heat exchangers to be used in a given example can be determined based on the available volume, weight limitations, and cooling requirements of any given engine.

Figure 6:
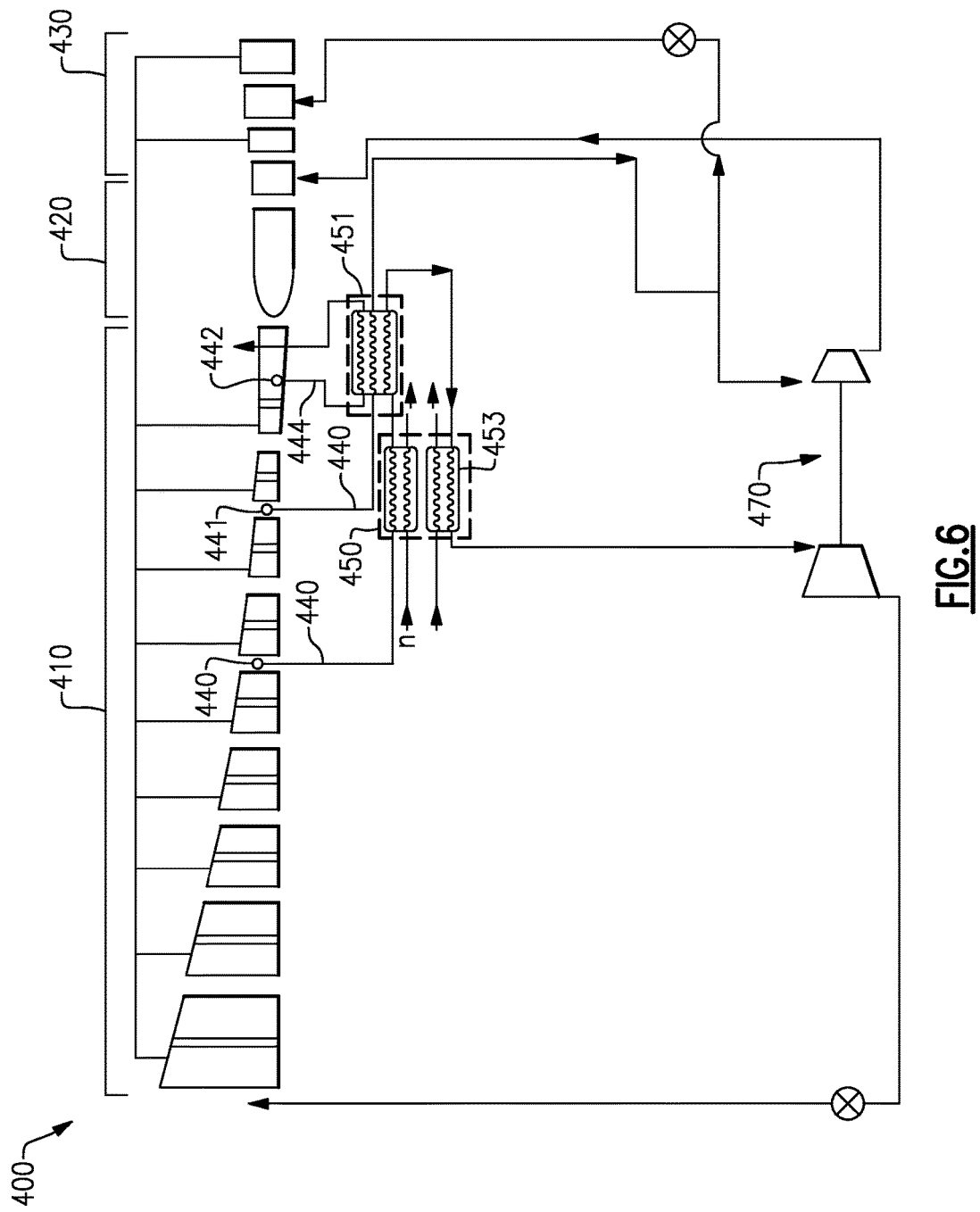
FIG. 6 schematically illustrates a third example cooled cooling air system for a gas turbine engine.

With continued reference to FIGS. 3 and 4, FIG. 6 illustrates another example configuration of a cascaded heat exchanger configuration for generating cooled cooling air in a gas turbine engine 400. The example of FIG. 5 utilizes a first compressor bleed 440 at an approximate mid-point in the compressor 410, a second compressor bleed 441 aft of the first compressor bleed 440, and a third compressor bleed 442 aft of the second compressor bleed 441. As with the examples of FIGS. 3 and 4, a first heat exchanger 450 and a fourth heat exchanger 453 utilize air from the bypass duct or the third stream as a heat sink. The first heat exchanger 450 receives air from the first compressor bleed 440 and cools the air using the heat sink air.

The cooled first bleed air 441 is provided as a heat sink in a parallel heat exchanger 451. The parallel heat exchanger 451 receives the second bleed air 443 and the third bleed air 444. The second bleed air 443 is simultaneously cooled by the first bleed air 441 and cools the third bleed air 444. Each of the outputs of the parallel heat exchanger 451 is provided to an auxiliary compressor system 470. The remainder of the features and connections are substantially similar to the features illustrated in FIGS. 3 and 4 and described above.

Figure 7:
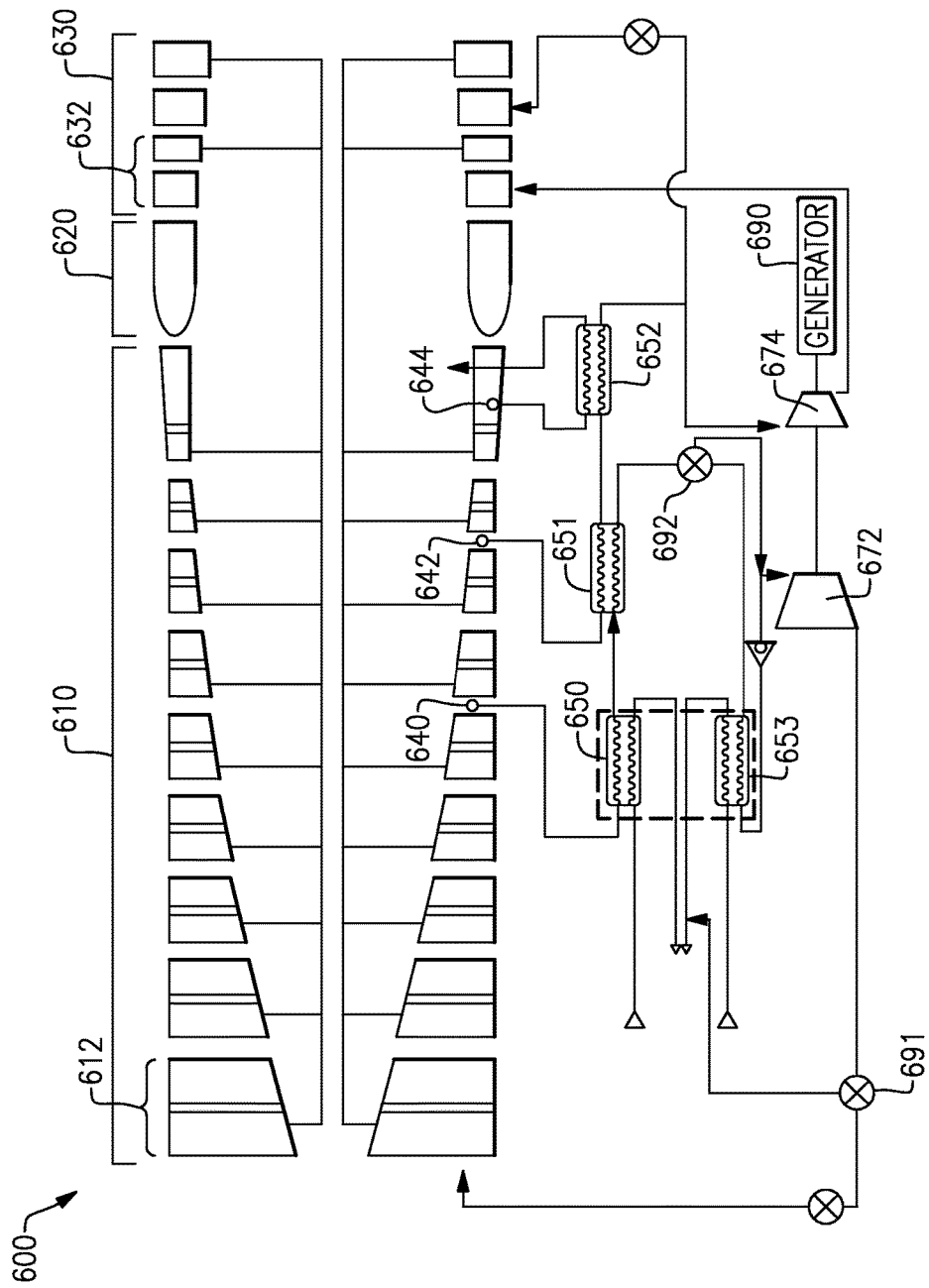
FIG. 7 schematically illustrates a fourth example cooled cooling air system for a gas turbine engine.

With continued reference to FIGS. 3 and 4, FIG. 7 illustrates a modification that can be applied to the gas turbine engine 200 in an example gas turbine engine 600. The heat exchangers 650, 651, 652, 653 are arranged in the same sequential cascading manner as in the example of FIG. 3. In addition to the heat sink flows, and cooled air flows of FIGS. 3 and 4, the example of FIG. 7 includes multiple diverter valves 691, 692. The diverter valves 691, 692 enable an increased power extraction from the auxiliary turbine 672. The fourth heat exchanger 653 can be partially or wholly bypassed such that an inlet temperature of the auxiliary turbine 672 is higher. Higher inlet temperatures increase the power output from the auxiliary turbine utilized to drive the auxiliary compressor 674 and an attached generator 690.

Figure 2:
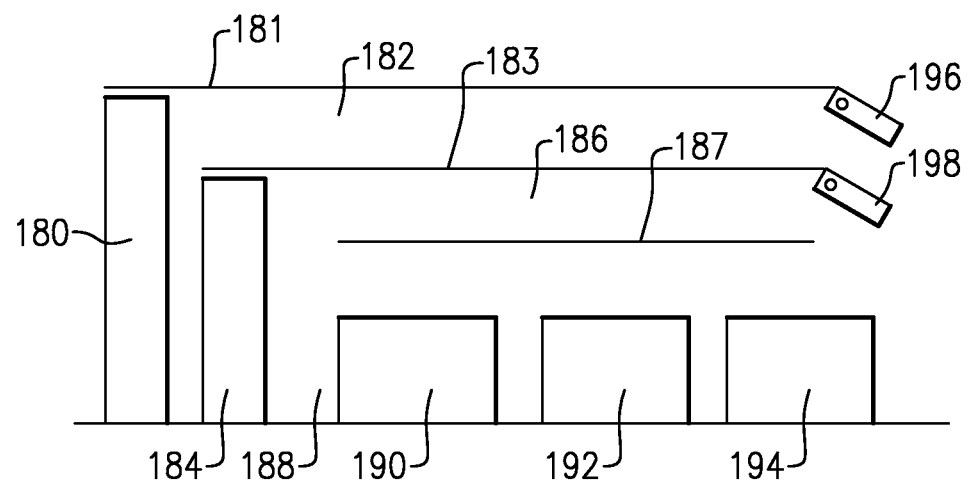
FIG. 2 schematically illustrates a second exemplary gas turbine engine.

Further, the second diverter valve 691 shunts auxiliary turbine discharge from the auxiliary turbine 672 to the fan bypass stream (in the case of an engine according to FIG. 1) or the third stream (in the case of an engine according to FIG. 2). The fan bypass stream or the third stream is at a lower pressure than the inlet to the core compressor. The expansion across the auxiliary turbine 672 is increased to expand the cooled air to match the inlet pressure of the bypass flow or the third duct flow, allowing the auxiliary turbine to extract more work from the cooled air.

With reference to FIGS. 3-7, the illustrated heat exchangers and cooled cooling air systems can be located in any physical location within a gas turbine engine, subject to design restraints. By way of example, each of the heat exchangers and the auxiliary compressor system can be positioned in a core cowling that surrounds the compressor, combustor, and turbine sections of the gas turbine engine. In alternative examples, the heat exchangers, auxiliary compressor system, generator, or any other elements, can be disposed in any other location within the gas turbine engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section;
   a combustor fluidly connected to the compressor section via a primary flowpath;
   a turbine section fluidly connected to the combustor via the primary flowpath;
   a cascading cooling system having a first inlet connected to a first compressor bleed, a second inlet connected to a second compressor bleed downstream of the first compressor bleed, and a third inlet connected to a third compressor bleed downstream of the second compressor bleed;
   the cascading cooling system including at least a first heat exchanger, a second heat exchanger in series with the first heat exchanger, and a third heat exchanger in series with the second heat exchanger configured to incrementally generate cooling air for at least one of an aft compressor stage and a foremost turbine stage relative to fluid flow through the turbine section; and
   wherein a heat sink input of the second heat exchanger is a cooled flow output of the first heat exchanger and originates at the first inlet, and wherein a heat sink input of the third heat exchanger is a cooled flow output of the second heat exchanger and originates at the second inlet.

2. The gas turbine engine of claim 1, wherein a cooled flow output of the third heat exchanger is provided to an aft most compressor stage as a cooled cooling flow and originates at the third inlet.

3. A gas turbine engine comprising:
a compressor section;
a combustor fluidly connected to the compressor section via a primary flowpath;
a turbine section fluidly connected to the combustor via the primary flowpath;
a cascading cooling system having a first inlet connected to a first compressor bleed, a second inlet connected to a second compressor bleed downstream of the first compressor bleed, and a third inlet connected to a third compressor bleed downstream of the second compressor bleed;
the cascading cooling system including at least one heat exchanger configured to incrementally generate cooling air for at least one of an aft compressor stage and a foremost turbine stage relative to fluid flow through the turbine section;
an auxiliary compressor system having an auxiliary turbine connected to an auxiliary compressor such that rotation of the auxiliary turbine drives rotation of the auxiliary compressor; and
wherein an input of the auxiliary turbine is connected to a heat sink outlet of a third heat exchanger such that cooling air originating at the second compressor bleed is compressed in the auxiliary compressor.

4. The gas turbine engine of claim 3, wherein an output of the auxiliary compressor system is provided to a foremost stage of the turbine section as cooled cooling air.

5. The gas turbine engine of claim 3, wherein an input of the auxiliary turbine is at least one of an output heat sink air of a second heat exchanger, and an output heat sink air of a fourth heat exchanger, and wherein an output of the auxiliary turbine is returned to a compressor section inlet.

6. The gas turbine engine of claim 5, wherein the input of the auxiliary turbine is a combination of a heat sink output of said second heat exchanger, and a heat sink output of said fourth heat exchanger, and wherein the combination is controlled by a modulation valve.

7. The gas turbine engine of claim 3, wherein fluid flow through said auxiliary turbine is at least partially controlled by a modulation valve downstream of an auxiliary turbine outlet, and wherein fluid flow to said inlet of said auxiliary compressor is at least partially controlled by a modulation valve connecting the heat sink outlet of said third heat exchanger to a second or later stage of said turbine section.

8. The gas turbine engine of claim 7, wherein each of said modulation valves is controlled by at least one controller.

* * * * *